Feb. 24, 1959
H. J. ANDERSEN ET AL
2,874,972
TRACTOR FRONT END SUSPENSION
Filed April 11, 1956
4 Sheets-Sheet 1
FIG. 1
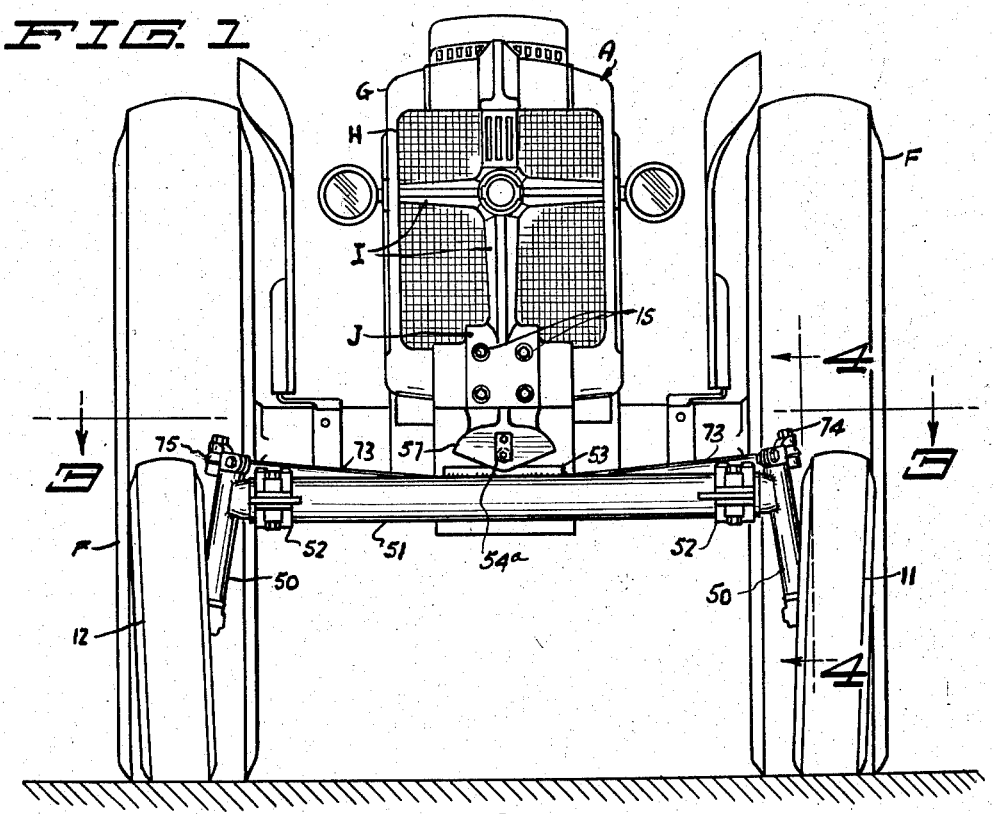
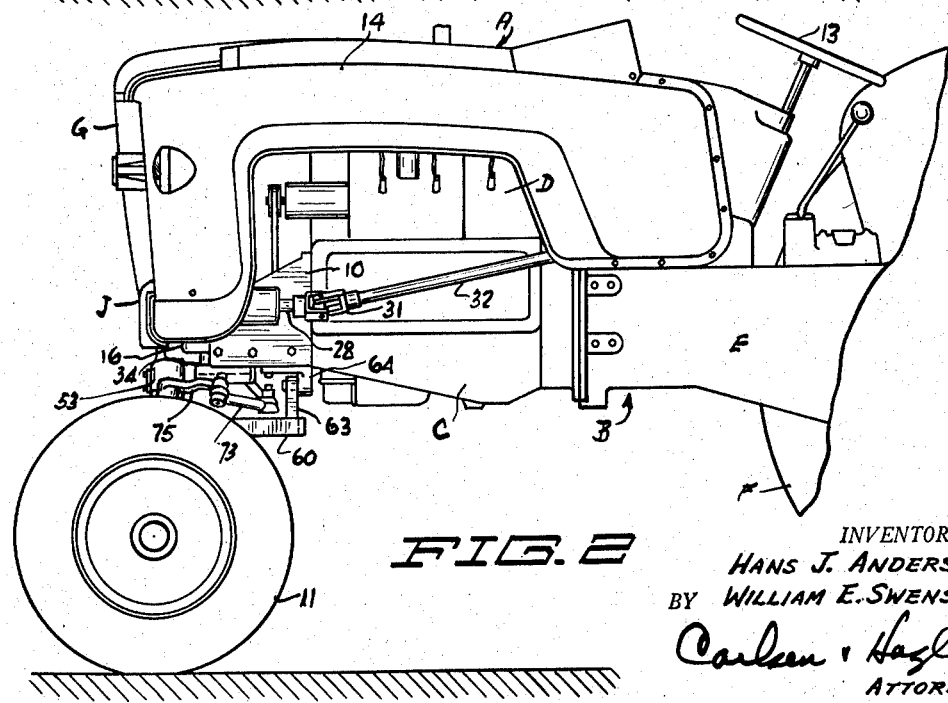
FIG. 2
INVENTOR.
HANS J. ANDERSEN
BY WILLIAM E. SWENSON
Carleen & Hagle
ATTORNEYS

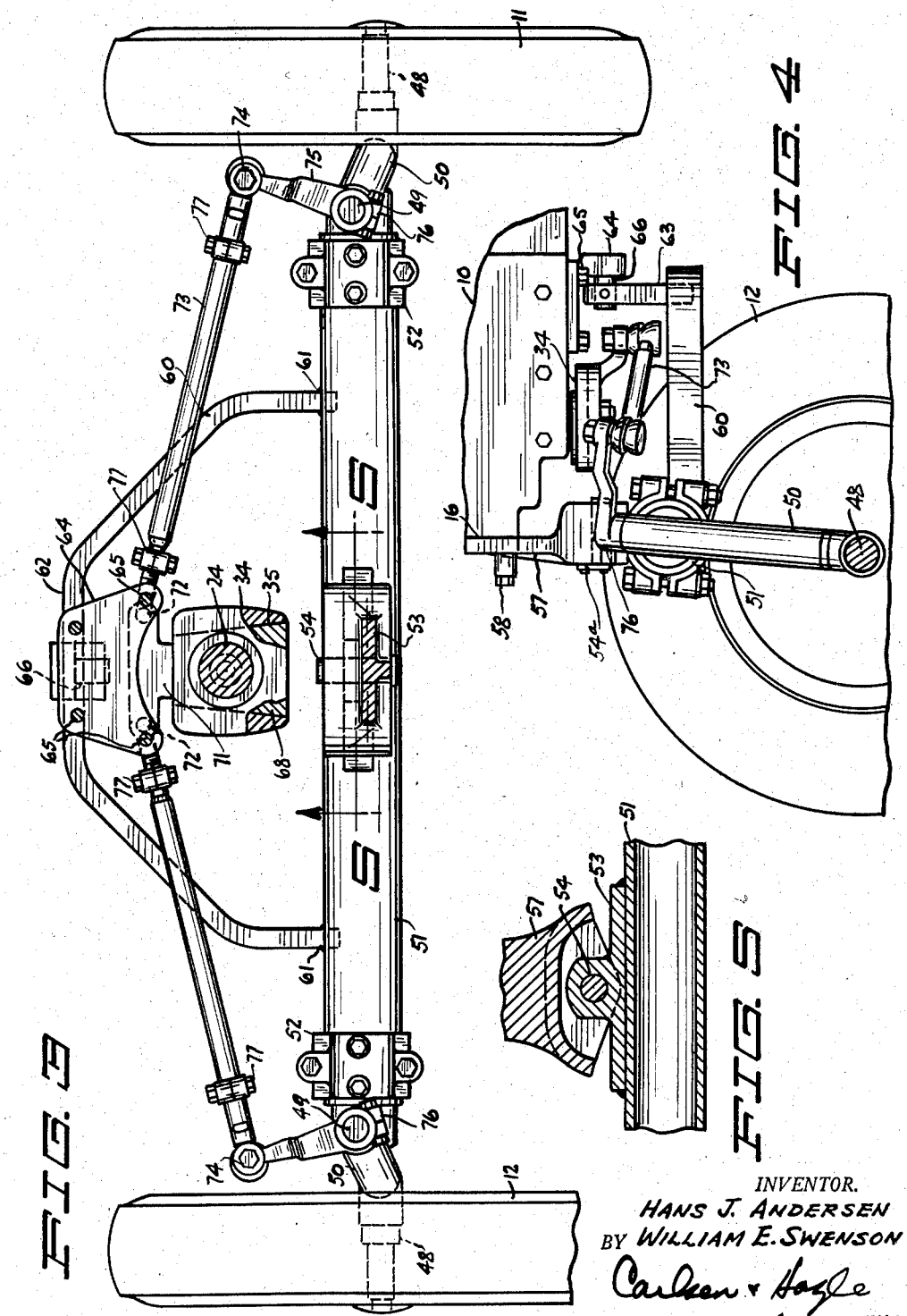

Feb. 24, 1959 H. J. ANDERSEN ET AL 2,874,972
TRACTOR FRONT END SUSPENSION
Filed April 11, 1956 4 Sheets-Sheet 3
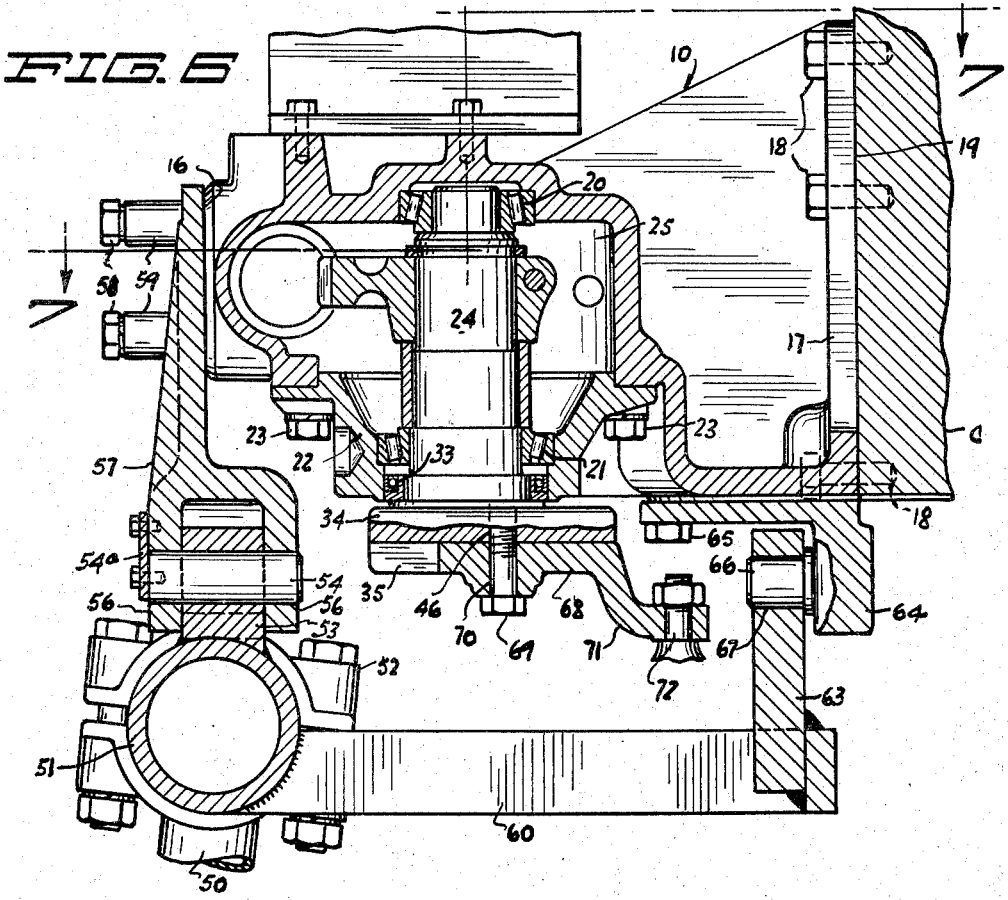
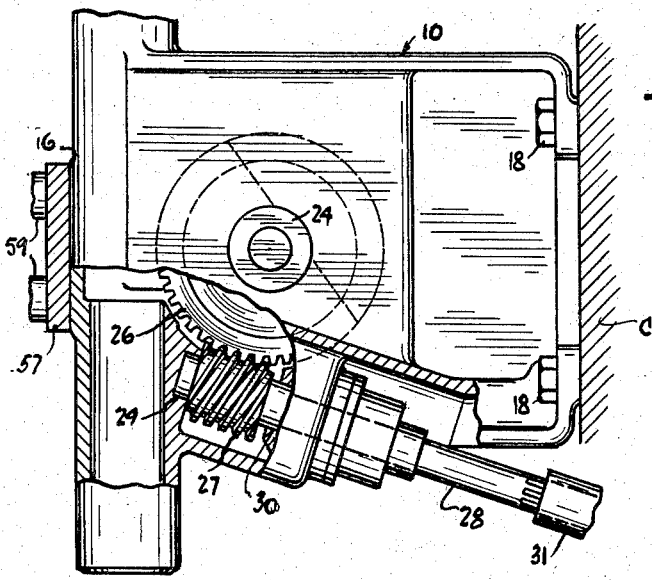
INVENTOR.
HANS J. ANDERSEN
BY WILLIAM E. SWENSON
ATTORNEYS Feb. 24, 1959 H. J. ANDERSEN ET AL 2,874,972
TRACTOR FRONT END SUSPENSION
Filed April 11, 1956 4 Sheets-Sheet 4

INVENTOR.
HANS J. ANDERSEN
BY WILLIAM E. SWENSON
ATTORNEYS

United States Patent Office 2,874,972
Patented Feb. 24, 1959

2,874,972

TRACTOR FRONT END SUSPENSION

Hans J. Andersen, Minneapolis, and William E. Swenson, St. Paul, Minn., assignors to Minneapolis-Moline Company, Hopkins, Minn., a corporation of Minnesota Application April 11, 1956, Serial No. 577,464

2 Claims. (Cl. 280—92)

This invention relates generally to improvements in tractors and more specifically to improvements in the front end suspensions therefor.

Tractors, particularly those for operation on the farm, are supplied with several types of front end suspensions to meet various row crop conditions and for the many and various operations to which such machines are put on the farm. For maximum stability the tractor may be provided with a pair of wide spread steerable front wheels, located at the end of an oscillating axle and steered through a tie rod system connected to the steering knuckles and spindles by which the wheels are mounted. This front end assembly provides a versatile arrangement for various harvesting, plowing and other operations, particularly where the wheel spacing is adjustable to correspond with the usual adjustment of the rear traction wheels. Going to the other extreme there is the tricycle type of suspension with a single centrally located steerable front wheel, for operation on closely spaced row crops such as beets, etc., and then there is the intermediate suspension with two close spaced, steerable front wheels for all around operations on row crops, for power take-off or belt pulley work and the like.

It is the primary object of this invention to provide a tractor having provision for the convenient application thereto of any one of the three front wheel suspensions just enumerated, so that the tractor may be supplied to the purchaser with either the wide spread dual wheel assembly, the single front wheel or the close spaced dual front wheels as he may desire, with a maximum of convenience in shifting from one to the other and in such fashion that the seller by maintaining only a minimum inventory of interchangeable parts may set up the machine in any way desired. Another object is to provide a tractor front end suspension which may be readily changed by the tractor user himself so that by purchasing two or three differently wheeled front ends he may use the same tractor with any front wheel arrangement that his work may require. Another object is to provide front end suspension means of this character which is relatively simple, inexpensive and durable in construction, conveniently convertible as required and safe in operation. Still another object of the invention, and an important one, is to provide an interchangeable front end suspension of the foregoing character wherein each of the differently wheeled front ends are steered by the same steering mechanism on the tractor and all of which are connected to a common dirigible mounting head or pedestal on the tractor itself.

These and other more detailed and specific objects will be disclosed in the course of the following specification, reference being had to the accompanying drawings, in which—

Fig. 1 is a front elevation of a tractor showing the same with a wide spread dual wheel front end suspension according to this invention.

Fig. 2 is a side elevation, the rear portion of the tractor being omitted.

Fig. 3 is an enlarged horizontal section of the front end suspension, taken substantially along the line 3—3 in Fig. 1.

Fig. 4 is an enlarged vertical sectional detail on the line 4—4 in Fig. 1.

Fig. 5 is a sectional detail on the line 5—5 in Fig. 3.

Fig. 6 is a further enlarged vertical, cross sectional detail through the steering mechanism of the tractor and associated components of the suspension of Figs. 1–5.

Fig. 7 is a horizontal sectional detail along the line 7—7 in Fig. 6.

Figure 8:
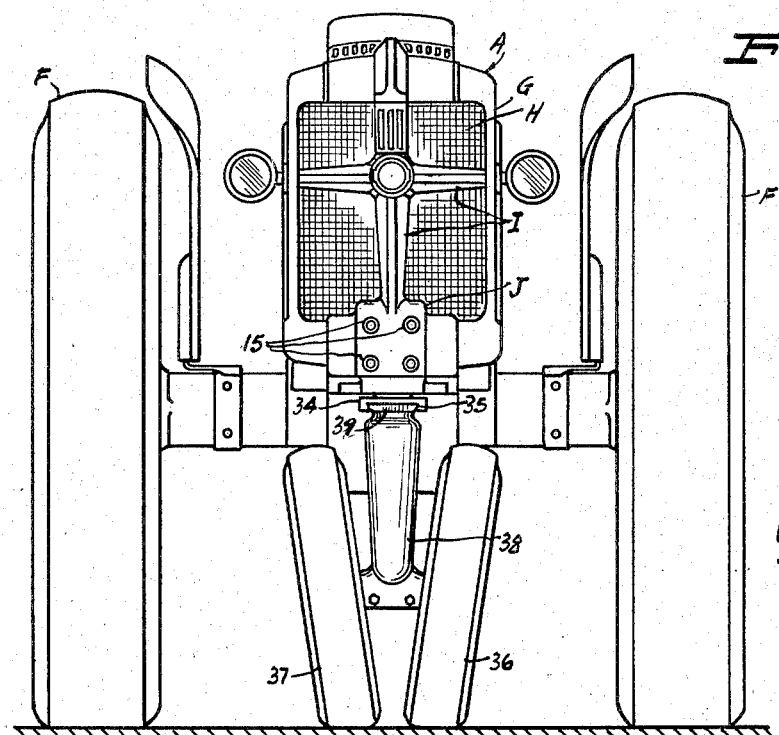
Fig. 8 is a front elevation of the tractor of Fig. 1 but with a close spaced dual wheel suspension.

Referring now more particularly and by reference characters to the drawing, A designates generally a tractor having a forwardly and rearwardly extending frame B which, as is usual in modern tractor manufacture, is made up of the crankcase C of the tractor engine D and a rearwardly extending casting assembly E for containing the change speed transmission parts (not here shown) which control the supply of propulsion power from the engine to rear traction wheels F. Thus the frame B constitutes the chassis of the tractor and in accordance with this invention there is bolted on the front end of the crankcase C a steering and front wheel mounting casting or housing 10 forming a forward continuation of said chassis. As is seen in Figs. 1 through 7, and as will now be described, the tractor is supported by wide spread dirigible front wheels 11—12 and these wheels are steered by the usual steering wheel 13 at the rear of the tractor. The tractor, of course, has the usual operator's seat (not here shown but to the rear of the steering wheel 13), a hood 14 partially enclosing the engine D and a radiator G which is mounted upon the casting or housing 10 and which in addition to the usual grille H has a frame I with a lower central portion J thereof having a series of openings 15 toward the front 16 of the housing 10.

The housing 10 is secured at its rear end 17 by cap screws 18 to the front end 19 of the crankcase C and forwardly thereof the housing is shaped to receive an upper bearing 20 (Fig. 6) aligned with a lower bearing 21 carried by a cap 22 secured by cap screws 23 to the housing. Journaled in these bearings 20—21 is a steering post 24 and between the bearings the housing 10 is hollow, as seen at 25, to provide space for a steering sector gear 26 which is secured upon the steering post and which meshes with a worm gear 27 (Fig. 7) having a shaft 28 journaled in bearings 29—30 in the housing. Said shaft 28 extends rearwardly from the housing 10 at one side and is connected by a universal joint 31 to a steering shaft 32 which is turned by the aforesaid steering wheel 13. Thus motion of the steering wheel will turn the steering post 24 about its upright axis. This steering post extends downwardly from the housing 10 and cap 22, through a seal 33 in the latter, at its lower end the post is secured to or forms a part of a mounting or steering head 34 horizontally located and having a dovetail groove 35 the sides of which converge in a rearward direction, as seen in Fig. 3.

Figure 11:
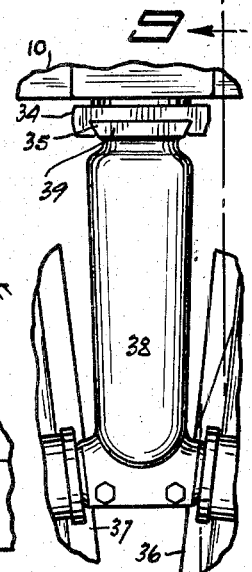
Fig. 11 is another front elevation of the dual wheel suspension of Fig. 8.
Figure 9:
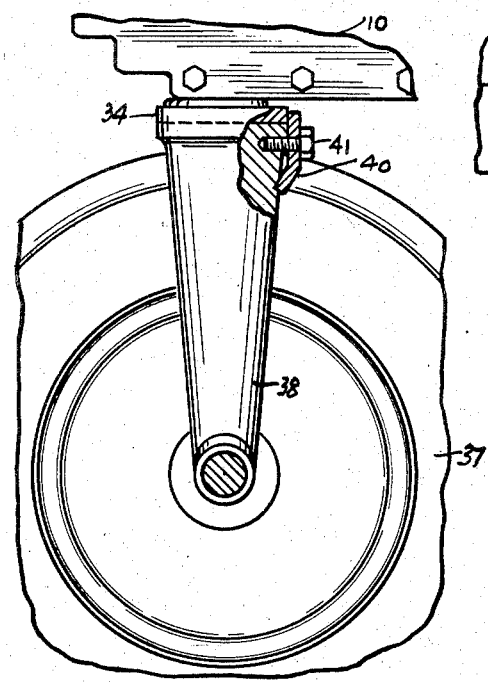
Fig. 9 is a vertical sectional view of the suspension of Fig. 8, the view being taken on the line 9—9 of Fig. 11.
Figure 10:
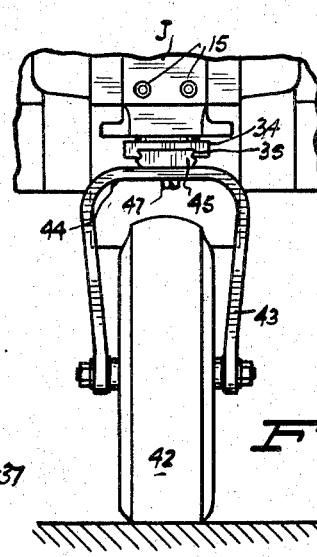
Fig. 10 is a front elevation of a single wheel front suspension applied to the steering mehanism of the tractor of Figs. 1, 8.

Turning now for the moment to Figs. 8, 9 and 11 the tractor A is therein shown as equipped with close spaced, cambered dual front wheels 36—37 which are journaled at the lower end and at opposite sides of a central standard 38, the top of which is provided with a dovetail tenon 39 wedge-shaped to fit the groove 35 in the steering head 34. This tenon 39 is slipped rearwardly into the groove 35 and the wheel assembly is held in place by means of a clip or clamp 40 held against the rear of the head 34 and standard 38 by a cap screw 41 threaded into the latter, said clip when pulled tight drawing the dovetail tenon 39 rearwardly and welding it tightly into place in the groove 35. To remove this dual wheel unit it is only necessary to remove the clip 40, or swing it aside clear of the rear edge of the steering head 34 and then drive the tenon free, withdrawing the unit forwardly from the tractor. If a single front wheel unit, or a tricycle type of overall tractor suspension is desired, then the single wheel 42 of Fig. 10 is used. This wheel is journaled in a fork 43 the upper bight portion 44 of which also has a wedge-shaped dovetail tenon 45 to fit the groove 35 in the steering head 34. A clip like that of Fig. 9 may again be used to hold the single wheel assembly in place, although as is seen in Fig. 6 the head 34 also has a tapped socket 46 and the fork 43 might also be held in place by a suitable cap screw, as designated at 47 in Fig. 10, driven upwardly through the bight 44 into said socket 46.

Returning now to the wide spread dual front suspension unit of Figs. 1–6, the wheels 11 and 12 are journaled on outwardly turned stub axles 48 carried by spindles 49 journaled in elongated bearings 50 carried at the ends of an oscillating front axle 51. This axle 51 is composed of telescoped tubular sections held by end clamps 52 so that the effective length of the axle and therefore the spacing between the wheels 11—12 may be adjusted as is customary, and in consononce with row crop spacings as well as tread adjustments of the traction wheels F. At the center of the axle 51 there is welded or otherwise suitably secured a heavy upstanding lug 53 having an opening extending from front to rear to receive a mounting pin 54, said lug 53 extending upwardly between the front and rear downturned ends 56 of a forked front mounting bracket 57, these ends 56 being also apertured to receive the pin 54. The pin 54 is held in place by a cap-screwed, removable retainer clip 54ᵃ as clearly shown in Fig. 6. This bracket 57 extends upwardly against the front end 16 of the housing 10 and the bracket is held in place by a series of cap screws 58 extending rearwardly through the bracket and into the housing. These cap screws 58 are lined up with the aforesaid openings 15 in the lower center J of the radiator so that the screws may be loosened or drawn tight by a socket wrench (not shown) extended rearwardly through the openings. To facilitate this the cap screws 58 are provided with spacer sleeves 59 to bring the heads of the screws forward, closer to said openings 15.

For increased fore and aft stability the front axle 51 is provided with a rearwardly extending, wide and somewhat U-shaped yoke 60 the ends of which are welded or otherwise suitably secured at 61 to the axle. Secured to the rear, center 62 of this yoke 60 is a hanger plate 63 extending upwardly beneath the housing 10 to the bottom of which is secured a rear mounting bracket 64 by cap screws 65. Said bracket 64 has a forwardly-rearwardly extending stub pin 66, the axis of which is aligned with that of the aforesaid pin 54, and this pin 66 is pivotally engaged with an opening 67 in the plate 63.

It will be readily appreciated that the just described mounting of the front axle 51 will cause the same to support the front of the tractor with a maximum of stability in both transverse and fore and aft planes, but that the axle may oscillate in a vertical plane about the axes of the pins 54 and 66 to enable the wheels 11—12 to follow inequalities in the ground surface while equally distributing load to the respective wheels.

For steering the wheels 11—12 the steering head 34 in this case is fitted with a steering plate 68 wedge-shaped to fit the dovetail groove 35 and held in place therein by a cap screw 69 passed upward through an opening 70 in the plate (Fig. 6) and screwed into the aforesaid socket 46. At its rear end this steering plate 68 is bent downwardly and then rearwardly, as seen at 71, in order to clear the rear bracket 64, and is laterally widened into a T-shape as seen in Fig. 3 providing spaced apart mounts for bolts 72 to which are pivoted outwardly extending tie rods 73 the outer ends of which are pivotally attached by similar bolts 74 to the rear ends of steering arms 75 which are secured by clamps 76 to the upper ends of the aforesaid spindles 49. Like the front axle 51 these tie rods 73 are made up of telescopically adjusted sections secured by clamps 77 so that length adjustments of the rods may be made in consonance with tread adjustments of the front wheels 11—12, as will be readily understood.

This steering linkage made up of the plate 68, tie rods 73 and arms 75 will transmit the steering movements of the head 34 to the front wheels 11—12 and here again the wheel assembly is readily removable, for replacement with a close spaced wheel unit or single wheel unit, merely by removing the pin 54 and removing cap screw 69 to free the steering plate 68 from the head 34 and if desired dismounting the rear bracket 64.

Thus it will be seen that we have provided a tractor front suspension which makes it possible to easily and quickly shift from one to another of three distinct wheel assemblies, i. e., the wide spread dual wheels, close spaced duals or the single wheel, providing the maximum of versatility to meet any and all operating conditions. Not only may the owner of the tractor make such changes conveniently as circumstances dictate, but the seller may as readily set up any front suspension which may be desired by the purchaser, on the same tractor and with a minimum invention of spare front wheel units.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a tractor having a frame, rear traction wheels, and a steerable front end suspension having an upright standard and close spaced dual front wheels journaled thereon, comprising a steering head having a wedge-shaped dovetail groove in its underside diminishing in width in a rearward direction, means journaling said steering head on the frame for oscillation about a generally upright axis, means for oscillating said steering head about said axis, means for mounting said front end suspension on said steering head for steering thereby and comprising a wedge-shaped dovetail tenon on the standard to wedge into the said groove in the steering head, and a clip operatively arranged to draw the tenon rearwardly into wedging engagement with the groove.

2. In a tractor having a frame and rear traction wheels, a steerable member journaled in the frame and having a steering head located immediately beneath said frame, the steering head having a wedge-shaped dovetail groove in its underside for mounting a front wheel standard having at least one front wheel and having a wedge-shaped tenon to fit said groove whereby said standard may be removed in its entirety from the steering head to change to a wide spread front wheel suspension, which suspension comprises an axle, front wheels steerably mounted at the ends of said axle, a rearwardly extending yoke member rigidly secured to the axle and having a central portion spaced rearwardly from the central portion of the axle, front and rear brackets mounted on the frame, coaxial pins pivoting the centers of the axle and the yoke member to said brackets to provide for upward and downward oscillation of the opposite ends of the axle, a wedge-shaped steering plate removably mountable in the groove in said steering head when the said standard is removed therefrom, and tie rods connecting the steering plate to steer the wide spread front wheels.

References Cited in the file of this patent

UNITED STATES PATENTS

| | | |
|---|---|---|
| 727,333 | Fieldhouse | May 5, 1903 |
| 1,792,035 | Roggeman | Feb. 10, 1931 |
| 2,074,685 | Engstrom | Mar. 23, 1937 |
| 2,175,965 | Madden | Oct. 10, 1939 |
| 2,232,972 | Ronning | Feb. 25, 1941 |
| 2,264,924 | Wolrab | Dec. 2, 1941 |
| 2,425,516 | DeWitt | Aug. 12, 1947 |
| 2,750,199 | Hart | June 12, 1956 |